United States Patent [19]

van der Lely et al.

[11] 4,318,284
[45] Mar. 9, 1982

[54] SHEAR PIN COUPLING

[75] Inventors: Ary van der Lely, Maasland; Cornelis J. G. Bom, Rozenburg, both of Netherlands

[73] Assignee: C. van der Lely N.V., Maasland, Netherlands

[21] Appl. No.: 12,728

[22] Filed: Feb. 16, 1979

[30] Foreign Application Priority Data

Feb. 17, 1978 [NL] Netherlands ............ 7801794
Jan. 31, 1979 [NL] Netherlands ............ 7900755

[51] Int. Cl.³ .................... F16D 3/56; F16D 7/00
[52] U.S. Cl. .................... 64/28 R; 64/15 R
[58] Field of Search .................... 64/28 R, 15

[56] References Cited

U.S. PATENT DOCUMENTS

| 1,740,617 | 12/1929 | Morgan | 64/28 R |
| 1,740,838 | 12/1929 | Roesen | 64/28 R |
| 1,778,477 | 10/1930 | Wood | 64/28 R |
| 2,384,188 | 9/1945 | Mercier | 64/28 R |
| 2,665,570 | 1/1954 | Ream | 64/28 R |
| 2,739,463 | 3/1956 | Pfister et al. | 64/28 R |
| 2,748,578 | 6/1956 | Potts | 64/28 R |
| 3,246,483 | 4/1966 | Schmitter | 64/15 R |
| 3,927,537 | 12/1978 | Anderson et al. | 64/28 R |

Primary Examiner—Henry K. Artis

[57] ABSTRACT

An overload coupling includes two portions that are relatively rotatable about a common axis upon overload. During operation, the driving portion turns the driven portion through one or more shear pins that are closely fitted in the same or a respective cutting element. In one version, the two portions have aligned sleeves that hold a common shear pin. The sleeves and pins can be readily exchanged for those able to transmit greater or lesser torque. Also, there can be two or more pins held in the aligned sleeves and offset from the sleeves' center line for adjustment. In another version, one portion can mount groups of pins, one of which fits into a recess between two cylindrical cutting elements. The elements have different sized cavities to closely bear on one pin until shear. After shear, the driving portion r.p.m. is reduced or stopped until another pin or portion is urged into the recess. Different sized pins can be used and each element rotated to expose the correct cavity. Either element engages the pin depending on direction of rotation.

28 Claims, 9 Drawing Figures

SHEAR PIN COUPLING

This invention relates to a shear pin coupling.

According to the present invention there is provided a shear pin coupling comprising two coupling members each having at least one insert which inserts, in normal operation, receive a common shear pin which thereby interconnects the two coupling members for rotation together, each of the inserts being removable for replacement by another insert for receiving a shear pin of a different diameter, securing means being provided for releasably securing each insert in position in the respective coupling member with respect to at least one direction of relative movement.

It is thus possible to replace the inserts so that the coupling can be used with shear pins of different diameters. Since a close fit between the shear pin and the inserts can be maintained, the shear pin coupling maintains its satisfactory protective effect despite the simple exchangeability.

Also, this invention relates to a shear pin coupling particularly suitable for use in an intermediate shaft intended for driving an agricultural machine having two coupling portions, each having at least one exchangeable, hard-steel cutting element having a contact surface engaged, during normal operation, by a shear pin interconnecting the two coupling portions for common rotation about a rotary axis characterized in that each of the cutting elements can be replaced by a cutting element having a differently shaped contact surface and can be fixed in place by means of fixing members in at least one direction with respect to the associated coupling portion.

For a better understanding of the present invention and to show how it may be carried into effect, reference will now be made, by way of example only, to the accompanying drawings, in which.

Figure 1:
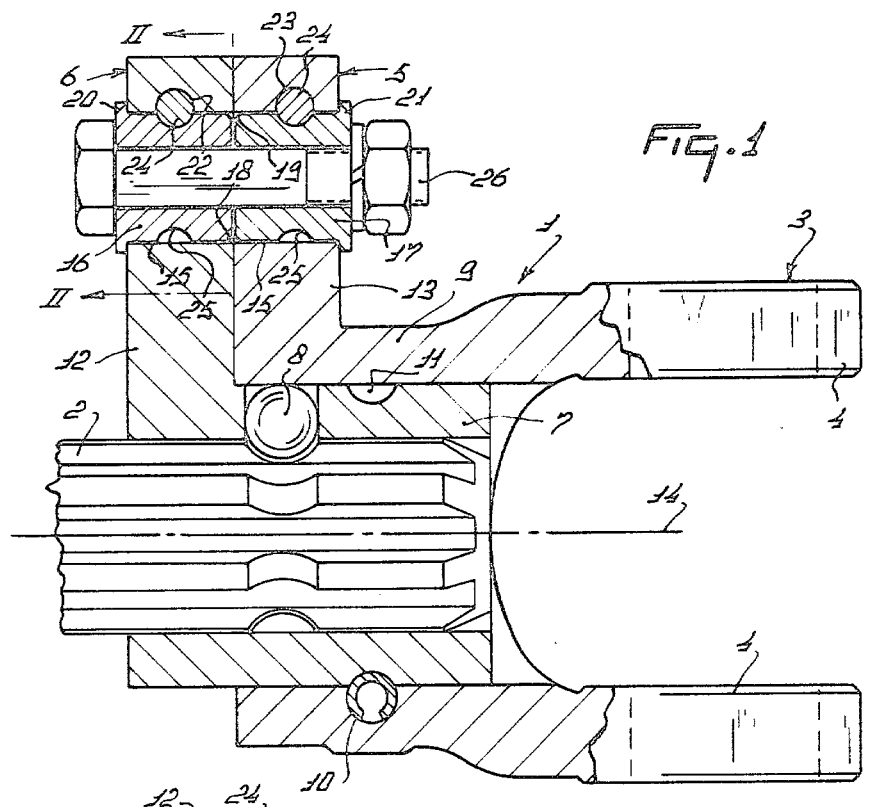
FIG. 1 is a sectional view of a shear pin coupling.
Figure 2:
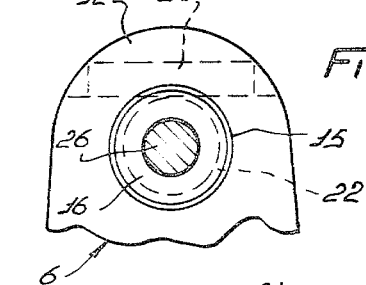
FIG. 2 is a sectional view taken along the line II—II in FIG. 1.

The shear pin coupling illustrated in FIG. 1 includes an end part 1 of a universal joint 3 which, in use, is part of an auxiliary shaft (not shown further), which establishes a driving connection between, for example, a tractor and an agricultural implement. It should be noted, however, that shear pin couplings in accordance with the present invention can be used in other kinds of drives, where protection against overload is desirable. The end part 1 has a fork 4 of the universal joint 3 and is arranged on a stub shaft 2 which may be, for example, the power take-off shaft of a tractor. The shear pin coupling comprises a first coupling member 5, which is integral with the fork 4, and a second coupling member 6, which is rigidly secured, in use, with the power take-off shaft 2. The connection between the coupling member 6 and the power take-off shaft is established by internal splines of a supporting hub 7 which engage corresponding external splines on the stub shaft 2. A ball 8 accommodated in a radial bore of the supporting hub 7 prevents relative axial movement between the hub 7 and the stub shaft 2. The supporting hub 7 is at least partly surrounded by a sleeve 9 which is part of the coupling member 5. Between the parts 7 and 9 there is a tangential retaining member in the form of a pin 10 which prevents relative axial movement between the two parts, although the presence of an annular groove 11 in the outer face of the hub 7 allows the sleeve 9 to rotate freely relatively to the supporting hub 7 after overload.

The hub is integral with a radially extending coupling lug 12 and the sleeve 9 with a radially extending coupling lug 13. As viewed axially, the boundary faces of these lugs 12 and 13 coincide over substantially the entire radial extent. Away from the interface between the parts 7 and 9, the two lugs 12 and 13 each have a bore 15 extending parallel to the rotary axis 14 of the coupling. In the embodiment shown, the bores 15 have a diameter of about 12 mms. Each bore 15 of the plates 12 and 13 contains a hardened insert in the form of a hard-steel sleeve 16 and 17 respectively. The hard-steel sleeves 16 and 17 preferably abut each other axially. The abutting ends have at the circumference chambers 18 and 19 respectively. Each cutting element also has a shoulder 20 or 21 located outside the respective coupling lug. In the embodiment shown the diameter of the shoulder is about 25 mms. Each coupling lug 12 and 13 has a bore 22 and 23 respectively through which pins 24 pass to fix the sleeves 16 and 17 axially in the bores 15.

Each sleeve 16 and 17 has an annular groove 25 cooperating with the respective pin 24. Through the space defined by the interiors of the sleeves 16 and 17 extends a shear pin or bolt 26, which in this embodiment is fixed in place with respect to the coupling by means of a bolt head and a nut. The shear pin 26 preferably fits closely in the sleeves 16 and 17, but there should be a clearance of about 0.5 mm. to allow easy replacement of the shear pin. In the embodiment shown the shear pin has a diameter of 10 mms.

In the embodiment shown the agricultural implement is driven in operation from the power take-off shaft 2 through the auxiliary shaft. The implement is protected against overload by the shear pin coupling. The universal coupling in the auxiliary shaft allows the drive to follow pivotal movements of the implement relative to the tractor. Owing to its structure the shear pin coupling is capable of withstanding the heavy bending torques involved in these pivotal movements. In the event of overload, the shear pin 26 will reliably break off under the action of the shear forces involved. Owing to the close fit between the shear pin and the sleeves, the pin 26 will break sharply without there being any risk of damage to other parts of the coupling. Since the shear pin coupling is accommodated in the auxiliary shaft, all kinds of implements can be satisfactorily protected against overload. If a maximum torsional torque of the coupling is to be changed, it is necessary only to remove the cutting elements 16 and 17 from the coupling lugs 12 and 13, after removing the pins 24, and to insert sleeves having a different inner diameter. Then a shear pin having a different diameter can be mounted in the coupling. This exchangeability of sleeves allows the shear pin coupling to be used universally under different conditions. The widened portions 20 and 21 not only assist in the insertion of the sleeves into the lugs 12 and 13 but they also increase the contact face between each sleeve and the respective coupling lug. This may be important if heavy forces are to be transmitted from the sleeve to the lug without damaging the lug.

Figure 3:
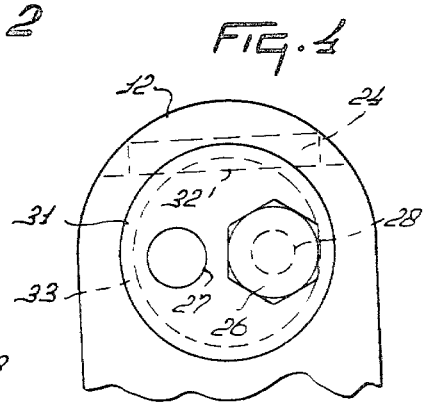
FIG. 3 is a sectional view corresponding to FIG. 2 illustrating a second embodiment.

The embodiment shown in FIG. 3 comprises a hard-steel sleeve 30 having two bores 27 and 28, which have different diameters. This means that shear pins of different diameters can be selected. In the embodiment shown, for example, the bore 27 can receive a shear pin of 10 mms., whereas the bore 28 can receive a shear pin of 8 mms. As in the first embodiment the sleeve 30 can be replaced by a different one, for example, one which can accommodate 7 and 9 mm. pins. In order to obtain a reliable overload safety the centerlines of the bores 27 and 28 lie on a common cylindrical plane, indicated by the line 29 in FIG. 3, centered on the axis of the coupling. In order to enable the sleeve 30 to be positioned correctly, the widened portion 30A of the sleeve 30 is hexagonal. The construction shown in FIG. 3 allows the user to readily adapt the shear pin coupling to withstand a different maximum torsional torque. It should be noted that, by rotating the sleeve with the aid of the hexagonal head 30A, the bore 27 or 28 and hence the associated shear pin can be moved to a different distance from the rotary axis 14. By changing this distance the maximum torsional torque to be transmitted will be altered. If desired, additional fixing means may be used for retaining the sleeve in the adjusted rotation position.

Figure 4:
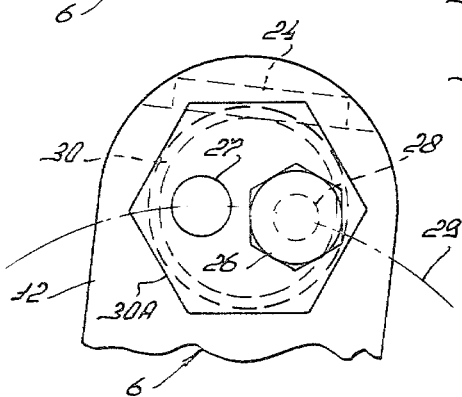
FIG. 4 is a sectional view like FIGS. 2 and 3 illustrating a third embodiment.

FIG. 4 illustrates by way of example how unintentional turning of a sleeve having a circular widened portion 31 can be prevented. The pin 24 lies in a tangentially extending, straight groove 32 in a sleeve 33 having two holes. In order to enable the rotational setting of the sleeve discussed with reference to FIG. 3, a plurality of straight, tangentially extending grooves 32 may be provided at the circumference of the sleeve 33, for example in polygonal form. It should be noted that in a further embodiment (not shown) of a sleeve it is possible to use only one bore, the centerline of which is offset from the centerline of the sleeve so that by turning the sleeve about its centerline the maximum torsional torque to be transmitted can be adjusted. It may be advantageous in this case to provide a different setting range of adjustable torques by replacing the sleeve. It should be noted that in a further embodiment (not shown) the sleeve may be provided with more than two bores so that a still greater choice of shear pin diameters can be made with only one sleeve.

Figure 5:
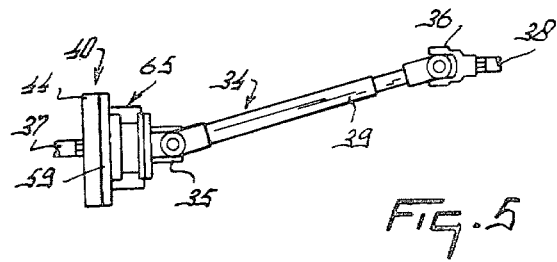
FIG. 5 is an elevational view of a driving shaft having a shear pin coupling in another embodiment.

FIG. 5 shows a driving shaft 34, in which a shear pin coupling in a second embodiment is used. The driving shaft 34 comprises two universal couplings 35 and 36, by means of which two end portions 37 and 38 of the driving shaft are connected with a central portion 39. The shear pin coupling 40 according to the invention is used in the end portion 37. Although the shear pin coupling 40 of FIG. 5 is employed in a driving shaft of variable form, it may as well be used in a rigid, straight shaft connecting a machine or a tool with a prime mover. The coupling may also be used in a shaft of a vessel or a vehicle, in which a driving screw or driving wheels respectively are connected by means of the driving shaft with a driving engine. The embodiment shown in FIGS. 5 to 9 is particularly significant for driving shafts which can be rotated in two directions.

Figure 6:
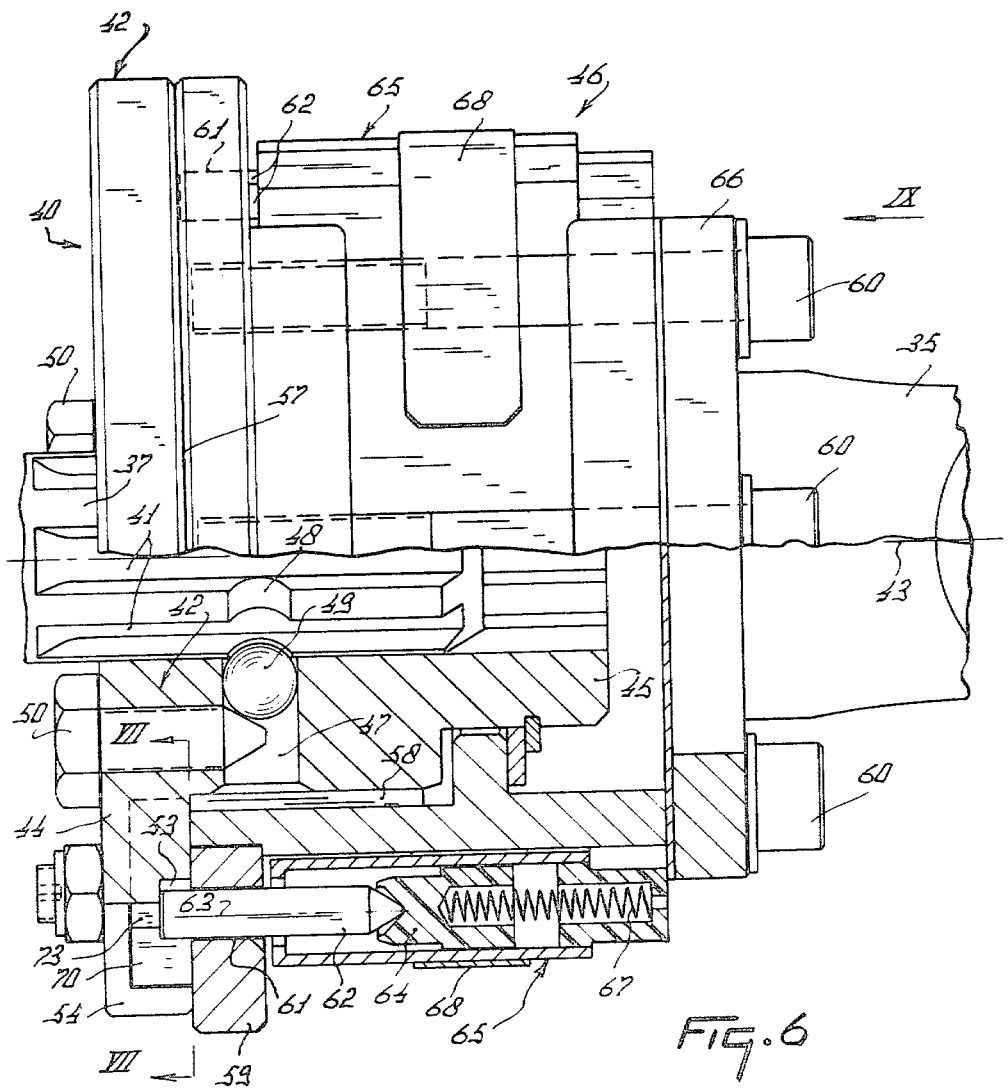
FIG. 6 is a sectional view of the coupling of FIG. 5.
Figure 7:
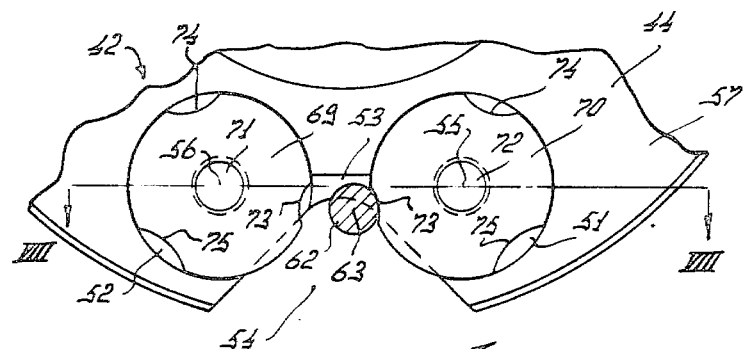
FIG. 7 is a sectional view taken on the line VII—VII in FIG. 6.
Figure 8:
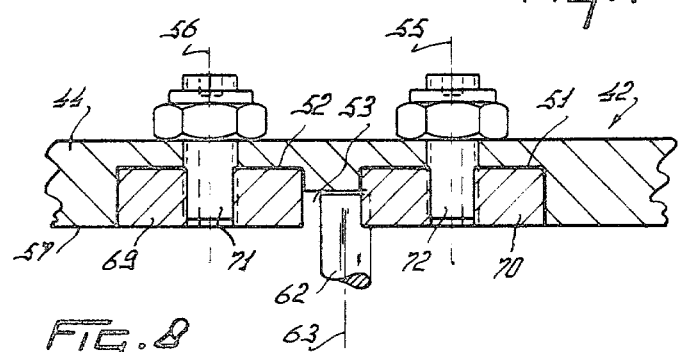
FIG. 8 is a sectional view taken on the line VIII—VIII in FIG. 7.
Figure 9:
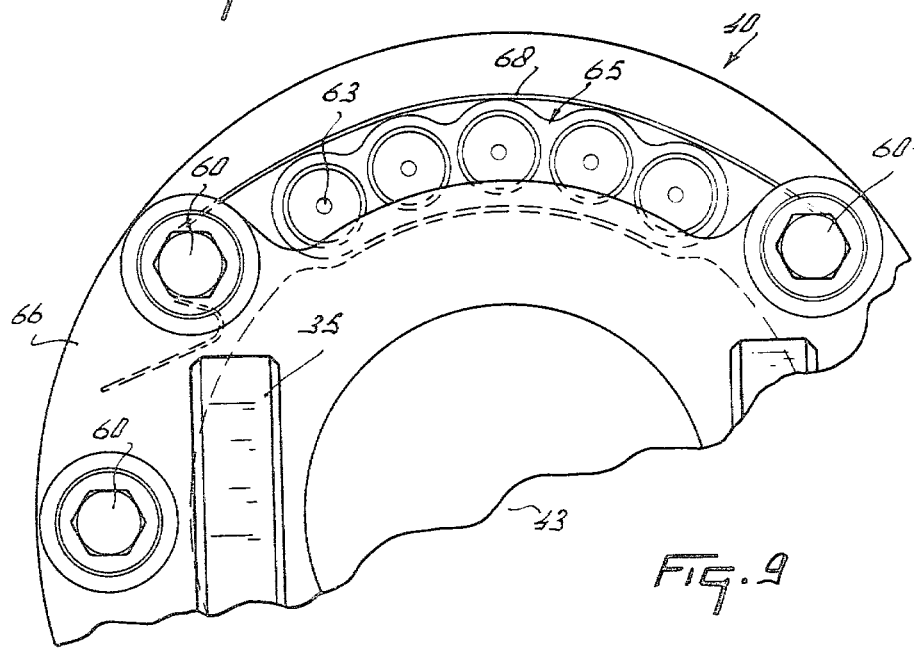
FIG. 9 is an elevational view in the direction of the arrow IX in FIG. 6.

The end portion or the shaft 37 (FIG. 6) has axially extending key ways fitting in key ways in a bore of a coupling portion 42, which is coaxial with the center line 43 of the shaft portion 37. The coupling portion 42 has a flange 44, which is normal to the center line 43 and it has furthermore a sleeve-like part 45, which extends inside the second coupling portion 46 and is also coaxial with the center line 43. The two parts 44 and 45, which form a single unit, have a number of cylindrical bores 47, for example, three, which are located, viewed in the direction of length of the shaft 37, at the level of a number of semi-cylindrical notches 48 provided in all key ways 41 of the shaft 37, said notches 48 all being located at the same distance from one end of the shaft 47. Each bore 47 receives a hard-steel ball 49, which is held by means of a conical tip of an axially extending bolt near the bore 47 concerned, in one or more notches 48 so that the balls 49 and the associated bolts 50 prevent the shaft 37 from shifting in an axial direction with respect to the coupling portion 42. Near the circumference of the flange 44 of the coupling portion 42 the boundary surface of the flange 42 facing the coupling portion 46 and being normal to the center line 43 has a number of recesses 51 to 54 (FIGS. 6, 7, 8). The recesses 51 to 54 are adjacent one another and terminate one in the other. From FIGS. 7 and 8 it will be apparent that the recesses 51 and 52 have a cylindrical shape and the center lines 55 and 56 respectively of the recesses 51 and 52 are both parallel to the center line 43. The distance between the center lines 55 and 56 exceeds the diameter of one of the recesses 51 and 52. The diameters of the recesses 51 and 52 are in this embodiment equal to one another. Between the recesses 51 and 52 is provided a recess 53 bounded by a plane at right angles to the center line 43, in this embodiment, at a smaller distance from the boundary surface 57 of the flange 44 (FIG. 8) than the circular boundary surface of the cylindrical recesses 51 and 52. This boundary surface of the recess 53 terminates at two edges in the cylindrical recesses 51 and 52. The recess 53 is located in between the recesses 51 and 52. A boundary surface of the recess 53 extending parallel to the center line 43 is located, as shown in FIG. 7, slightly above the line of connection between the center lines 55 and 56.

The recesses 51, 52 and 53 are joined by a recess 54, which is located symmetrically to a radial plane midway between the center lines 55 and 56. The recess 54 has the shape of a V and extends throughout the thickness of the flange 44. The rounded-off tip of the V-shaped recess 54 is located in a radial plane midway between the center lines 55 and 56, while the two sides of the recess 54, viewed in the direction of the outer circumference of the flange 44, diverge symmetrically to said radial plane. The outermost ends of the sides of the V-shaped recess 54 are spaced apart by a distance which is substantially equal to or slightly larger than the distance between the center lines 55 and 56. The boundary faces of the recesses 51, 52 and 53 at right angles to the center line 43 join the recess 54 by part of their circumference.

The coupling portion 46 (FIG. 6), which is coaxial with the sleeve-like part 45 of the coupling portion 42, supports this sleeve-like part 45 by means of a needle bearing 58, which surrounds the sleeve-like part 45. The coupling portion 46 comprises furthermore a hard-steel flange 59, which joins by one of its boundary faces at right angles to the center line 43, the boundary face 57 of the flange 44 of the coupling portion 42. The flange 59 is fastened by means of a number of bolts 60 arranged in the coupling portion 46 to the further part of this coupling portion. The flange 59 has two rows of holes 61, which extend parallel to the centre line 43. The center lines of the holes 61 are all located at the same distance from the center line 43. One of the rows of holes amounts to five holes in this embodiment and the distance between the center lines of this row of holes exceeds by about 30% the diameter of one of the holes of said row. The other row of also five holes in this embodiment is located on the diametrically opposite side of the coupling portion 46. The holes 61 may all have the same diameter, but there may, as an alternative, be three groups of holes, each group of holes having different diameters.

Through all holes 61 in the flange 59 are passed hard-steel shear pins 62, each of which narrowly fits in the holes 61 concerned, so that, if for example, three groups of holes of relatively different diameters are used, shear pins 62 of three different diameters are inserted. Although reference is made here to diameters of shear pins, supposed to be cylindrical pins, other shapes of shear pins may obviously be employed, for example, square, hexagonal and such like shapes.

The distance between the center lines of the holes 61 from the center line 43, which distance is the same for all holes 61, corresponds with the distance of the center line 43 from a center line indicated in FIG. 7 by point 63. The point 63 is located near the rounded-off tip of the V-shaped recess 54 in the flange 44.

All shear pins 62 are pressed home on the side of the flange 59 remote from the flange 44 by means of a spring-loaded gland 64, which is arranged in a holder 65 disposed between the flange 59 and a flange 66 of the coupling portion 46. To each of the two rows of holes 61 is associated a holder 65. Each holder 65 comprises in this embodiment five adjacent glands 64, which are slidable in the holder 65 in a direction parallel to the center line 43 under the action of a spring 67. The holders 65 are each fixed by means of a resilient clamp 68 adapted to turn about a bolt 60. Each spring steel clamp 68 can be readily released manually for removing the holder 65 concerned, in which case the end of the holder facing the flange 66 can be turned outwardly and be withdrawn in a direction towards the central portion 39 of the shaft 34.

For this purpose each holder 65 has a number of holes located in the mounted state on the side of the holder 65 facing the flange 59, the diameters of said holes being appreciably larger than those of the shear pins 62 concerned, passed through said holes.

During operation the ends of all shear pins 62 (but one) remote from the glands 64 are in contact with the boundary surface 57 of the flange 44. Only one of the shear pins 62 (it may be anyone of the whole collection of shear pins) can emerge from the flange 59 and come into contact with the boundary surface of the recess 53 at right angles to the center line 43 in the flange 44.

Each of the two recesses 51 and 52 in the flange 44 holds a substantially cylindrical cutting element 69 and 70 respectively (FIGS. 6 and 7), the axial dimension of which is equal to the depth of the cylindrical recess 51 or 52. The cylindrical outer circumference of each of the cutting elements 69 and 70 is fitting but rotatable in the cylindrical boundary surfaces of the recesses 51 and 52 respectively. Each of the two cutting elements 69 and 70 is fastened to the flange 44 by means of bolts 71 and 72 respectively. The cutting elements 69 and 70 and the associated bolts 71 and 72 are coaxial with the center lines 55 and 56 of the recesses 51 and 52. The cylindrical boundary surfaces of the cutting elements 69 and 70 have a number of cavities 73, 74 and 75, in this embodiment three, bounded each by part of a cylindrical surface, each of said cylindrical surfaces form part of the external boundary of the cutting element 69 and 70 respectively. The radii of curvature of the cylindrical wall portions of a cutting element are relatively different. These radii of curvature match the radii of curvature of the outer circumferences or shear pins of different diameters so that each cutting element 69, 70 can be used for shear pins of different diameters. When the bolts 71 and 72 are slightly loosened, the cutting element concerned can be turned about the center lines 55 and 60 respectively, so that after the turn of the cutting element the desired cavity 73, 74 or 75 can be disposed so that the center line of this partly cylindrical cavity coincides with the aforesaid center line 63, which coincides with the center line of a shear pin in operation. Therefore, the driving torque to be transferred by the driving shaft 34 is passed via, for example, the cutting element 70 and the shear pin 62 located in the cavity 73 from the flange 44 of the coupling portion 42 to the coupling portion 46 to the implement to be driven. As soon as overload occurs, for example, due to stagnation of the implement to be driven, the part of the shear pin 62 located at the recess 73 of the cutting element 70 breaks off so that the coupling portions 42 and 46 can rotate with respect to one another without the risk of damage of the other parts of the shaft. While the flanges 44 and 59 are turning one along the other subsequent to overload and to the break-down of the operative shear pin these flanges can support one another for balancing the bending moments exerted by the coupling portions on one another. An axial shift of the coupling portions 42 and 46 is avoided by the balls 49 in the bores 47 and the notches 48 of the key ways 41.

The broken fragment of the overload shear pin 62 can escape through the space formed by the recess 54 in the flange 44 and it is usually swept out. The part of the shear pin 62 severed by the cutting element 70 (FIG. 7) is guided immediately after the rupture by the cutting element 69 or one of the cavities respectively of said element so that the fragment emerges through the recess 54.

If the driven shaft 37 continues rotating with the operational speed, the remaining part of the shear pin 62 or anyone of the other shear pins 62 will not be in a position to come into contact with the boundary surface of the recess 53 by passing in between the two cutting elements 69 and 70 owing to the proportioning of the construction shown in FIG. 7. Therefore, the operator's attention is emphatically drawn to the occurrence of an overload so that he can take steps to obviate the cause thereof. In order to permit another shear pin 62 or the remaining part of the same shear pin 62 to pass between the cutting elements 69 and 70, the number of revolutions of the driving engine has to be intentionally reduced to a low or a very low value in order to engage the new shear pin or the shear pin portion. The proportions of the relative disposition of the cutting elements 69 and 70 and the proportioning of the recess 54 mainly determine the value of the reduced speed. After a new shear pin 62 or the remaining part of the broken shear pin has again come into contact with the boundary surface of the recess 53, the speed can be raised to the normal value for normal operation. The new shear pin or the shear pin portion is one of the ten items of this embodiment, which are pressed home by the two holders 65, but it cannot be predicted which shear pin will become operative.

When the drive is performed in a different direction, as may be the case in vehicles and vessels, machine tools and the like, the shear pin 62 is in contact with a boundary surface of one of the cavities 73 to 75 of the other cutting element, in this embodiment the cutting element 69. Therefore, this automatic shear pin coupling can be used for two directions of rotation.

The shear pin coupling according to the invention may also be used for shear pins of different diameters for a drive in which higher or lower maximum values of the driving torque are desired. In this case the cutting element 69 or 70 is turned about the center line 55 or 56 respectively until the cavity 73, 74 or 75 is located near the center line 63 (FIG. 7) in a manner such that the center of the curvature of the cavity concerned substantially coincides with the center line 63, the radius of curvature substantially corresponding to the desired diameter of the shear pin. In this way cavities 73, 74, 75 may be used whose shape corresponds to shear pin diameters of, for example, 8, 9 or 10 mms. In order to allow the use of shear pins of different diameters, the flange 59 may have groups of holes of different diameters. If, for example, the flange 59 has accommodation for three different diameters and if it is desired to raise the maximum admissible torque, so that, for example, shear pins of the middle diameter (for example, 9 mms) are wanted rather than shear pins of the smaller diameter (8 mms), all shear pins having the smaller diameter (8 mms) are removed as well as the shear pins having the larger diameter (10 mms) so that the flange 59 comprises only groups of 9 mm pins. In this way the desired maximum torque to be transferred can be varied without the need for dismounting the entire coupling. If a further cavity 73, 74 or 75 has to be brought into contact with the shear pin, the bolt 71 or 72 concerned is slightly loosened, after which the cutting element is turned. It should be noted that, as has been shown in practice, identification of the desired cavity is satisfactorily possible via the recess 54 so that the desired cavity can be correctly positioned with respect to the center line 63. The bolt 71 or 72 is subsequently retightened.

The removal of shear pins 62 or the insertion of new pins can be simply performed by opening the clamps 68, after which the ends of the holders 65 remote from the flange 44 can be slightly lifted outwardly and be subsequently taken out in the direction of the central portion 39. The pins can then be taken out of the holes 61 or be inserted into said holes. Mounting of the holders 65 is performed by the inverse order of operations.

It should be noted that during operation only part of the head face of the operative shear pin 62 need be in contact with the boundary surface of the recess 53, whilst the further part of said face is hanging in the recess 54 (FIG. 7).

This preferred disposition is conducive to a rapid ejection of the shear pin fragment subsequent to an overload.

While various features of the couplings that have been described, and that are illustrated in the drawings, will be set forth in the following claims as inventive features, it is to be noted that the invention is not necessarily limited to these features and that it encompasses all of the features that have been described both individually and in various combinations.

We claim:

1. A shear pin coupling for driving use comprising two portions that are relatively rotatable about a common axis, said portions being interconnected for rotation in common by overload shearing means, said shearing means including at least one shear pin and a curved contact surface that engages said pin, means setting the amount of contact between said surface and said pin, said contact surface including at least one cylindrical cutting element and the center line of the shear pin being located a distance from the center line of said cutting element, means fixing said contact surface against displacement.

2. A shear pin coupling as claimed in claim 1, wherein said element can be set in a plurality of positions with respect to the respective coupling portion, and said shear pin can be set in a plurality of positions with respect to the common axis of rotation of said portions.

3. A shear pin coupling as claimed in claim 1, wherein said portions adjoin one another at an interface and said element is a sleeve with setting means located on one side of the coupling opposite said interface.

4. A shear pin coupling as claimed in claim 3, wherein said setting means is located outside the coupling portions.

5. A shear pin coupling as claimed in claim 4, wherein said setting means is a widened part of the sleeve.

6. A shear pin coupling as claimed in claim 1, wherein said surface is provided by at least one cutting element and that element has a plurality of contact surfaces that are interchangeable.

7. A shear pin coupling as claimed in claim 6, wherein each cutting element has at least two contact surfaces with relatively different radii of curvature.

8. A shear pin coupling for driving use comprising two portions that are relatively rotatable about a common axis, said portions being interconnected for rotation in common by overload shearing means, said shearing means including at least one shear pin and a curved contact surface that engages said pin, means adjusting the amount of contact between said surface and said pin to vary the torque needed for overload, said contact surface including at least one cylindrical cutting element and means fixing said contact surface against displacement.

9. A shear pin coupling as claimed in claim 8, wherein said contact surface is afforded by a respective cutting element for each portion.

10. A shear pin coupling as claimed in claim 9, wherein said elements are sleeves that closely surround said pin and a respective tangential pin engages the outer surfaces of each corresponding sleeve.

11. A shear pin coupling as claimed in claim 10, wherein each sleeve is cylindrical and has an annular groove in its outer surface that receives said tangential pin.

12. A shear pin coupling as claimed in claim 11, wherein said portions have flanges that house said sleeves and said sleeves are aligned with one another, said tangential pin securing the respective sleeve against displacement in an axial and/or tangential direction.

13. A shear pin coupling for use in a driving shaft comprising two portions that are relatively rotatable about a common axis, at least one of said coupling portions having two cutting elements which alternatively engage shear pin means and the latter interconnecting said coupling portions for common rotation about said axis, said cutting elements being relatively positioned one on each side of said shear pin means and adjacent same.

14. A shear pin coupling as claimed in claim 13, wherein one shear pin of said shear pin means is engageable by either of said two cutting elements, depending upon the direction of rotation of said shaft.

15. A shear pin coupling as claimed in claim 14, wherein said shear pin is located at least partly in an opening provided in at least one of said coupling portions, said opening communicating with a space outside the coupling.

16. A shear pin coupling as claimed in claim 15, wherein each of the two cutting elements is displaceable to expose different contact surfaces that cooperate with shear pins of different diameters to interconnect said portions for common rotation.

17. A shear pin coupling as claimed in claim 14, wherein said shear pin means comprises a plurality of spring loaded shear pins and subsequent to overload, said shear pin is automatically replaced by a further shear pin.

18. A shear pin coupling for driving use comprising two portions that are relatively rotatable about a common axis, said portions being interconnected for rotation in common by overload shearing means, said shearing means including replaceable shear pin means and at least one cutting element having a plurality of interchangeable contact surfaces that selectively engage said shear pin means, said surfaces being curved with relatively different radii, whereby shear pins of different diameters can be engaged and received by said surfaces.

19. A shear pin coupling as claimed in claim 18, wherein said element is a respective sleeve for each portion and the sleeves are aligned, each sleeve having one cylindrical bore and the center lines of the bores being located in a cylindrical plane around said axis of rotation.

20. A shear pin coupling as claimed in claim 18, wherein there are a plurality of cutting elements and subsequent to overload, said shear pin means includes at least one pin that can be automatically replaced.

21. A shear pin coupling as claimed in claim 20, wherein, subsequent to a reduction of the speed of rotation of one coupling portion, the replaceable shear pin means contacts with a contact surface.

22. A shear pin coupling as claimed in claim 21, wherein each element is cylindrical and at its circumference, there are spaced apart cavities forming contact surfaces.

23. A shear pin coupling as claimed in claim 22, wherein said cavities are spaced apart by parts of the cylindrical surfaces of said element.

24. A shear pin coupling as claimed in claim 23, wherein the radii of curvature of said cavities are different.

25. A shear pin coupling as claimed in claim 24, wherein each cutting element is pivotable about a respective pivotal axis and means fixing said element various positions to expose each cutting surface.

26. A shear pin coupling as claimed in claim 25, wherein, viewed in a tangential direction, a cutting element is positioned on each side of said shear pin.

27. A shear pin coupling as claimed in claim 25, wherein center lines of said cavities, with respect to the respective pivotal axis, each coincide with a fixed imaginary line that is stationary with respect to the coupling.

28. A shear pin coupling as claimed in claim 26, wherein said imaginary line coincides with the center line of a shear pin.

* * * * *